(12) United States Patent
Halmos

(10) Patent No.: US 10,955,534 B2
(45) Date of Patent: Mar. 23, 2021

(54) LINEAR FM CHIRP WAVEFORM FOR A LADAR TRANSCEIVER

(71) Applicant: Raytheon Company, Waltham, MA (US)

(72) Inventor: Maurice J. Halmos, Encino, CA (US)

(73) Assignee: Raytheon Company, Waltham, MA (US)

( * ) Notice: Subject to any disclaimer, the term of this patent is extended or adjusted under 35 U.S.C. 154(b) by 404 days.

(21) Appl. No.: 15/799,132

(22) Filed: Oct. 31, 2017

(65) Prior Publication Data
US 2019/0129016 A1 May 2, 2019

(51) Int. Cl.
*G01C 3/08* (2006.01)
*G01S 7/4911* (2020.01)
*H04B 10/40* (2013.01)
*G01S 7/481* (2006.01)
(Continued)

(52) U.S. Cl.
CPC .............. *G01S 7/4911* (2013.01); *G01S 7/484* (2013.01); *G01S 7/4815* (2013.01); *G01S 17/26* (2020.01);
(Continued)

(58) Field of Classification Search
CPC ...... G01S 7/4911; G01S 17/26; G01S 7/4815; G01S 7/484; G01S 17/32; H04B 10/40; H04B 2210/516
(Continued)

(56) References Cited

U.S. PATENT DOCUMENTS 5,715,044 A * 2/1998 Hayes ................. G01S 17/42
356/5.09
6,236,353 B1 * 5/2001 Cermignani ............ G01S 7/36
342/159
(Continued)

FOREIGN PATENT DOCUMENTS

CN 105548972 A 5/2016
EP 2 618 179 A1 7/2013
(Continued)

OTHER PUBLICATIONS

DiLazaro et al., "Multi-terahertz Frequency Sweeps for High-resolution, Frequency-modulated Continuous Wave Ladar Using a Distributed Feedback Laser Array;" Optics Express, vol. 25, No. 3; Jan. 30, 2017; 14 Pages.
(Continued)

*Primary Examiner* — Mark Hellner
(74) *Attorney, Agent, or Firm* — Daly Crowley Mofford & Durkee, LLP

(57) ABSTRACT

Methods and systems for generating a high bandwidth linear FM chirp for a laser detection and ranging (LADAR) transceiver is described herein. The LADAR transceiver includes an array of laser sources configured to generate a series of pulses with each pulse offset in frequency by a respective frequency offset from a previous pulse and a subsequent pulse in the series of pulses. A ladder signal can be generated from the series of pulses and modulated with a modulation signal having a modulation bandwidth corre-
(Continued)

sponding to the frequency offset between each pulse to generate the linear chirp signal. The linear chirp signal can have a chirp bandwidth corresponding to the number of laser sources in an array and a modulation bandwidth of the modulation signal.

21 Claims, 7 Drawing Sheets

(51) Int. Cl.
  *G01S 17/32* (2020.01)
  *G01S 7/484* (2006.01)
  *G01S 17/26* (2020.01)
(52) U.S. Cl.
  CPC .............. *G01S 17/32* (2013.01); *H04B 10/40* (2013.01); *H04B 2210/516* (2013.01)
(58) Field of Classification Search
  USPC ........................................................ 356/5.01
  See application file for complete search history.

(56) References Cited

U.S. PATENT DOCUMENTS

| | | | |
|---|---|---|---|
| 2005/0041253 A1* | 2/2005 | Pearson | ................. H04B 10/63 356/484 |
| 2015/0177367 A1* | 6/2015 | Sebastian | ................. G01S 17/58 356/5.09 |
| 2016/0377721 A1 | 12/2016 | Lardin et al. | |
| 2017/0350982 A1* | 12/2017 | Lipson | .................. G01S 7/4876 |

FOREIGN PATENT DOCUMENTS

| | | | | |
|---|---|---|---|---|
| EP | 2 871 492 A1 | | 5/2015 | |
| EP | 3546982 A1 | * | 10/2019 | ............. G01S 17/95 |

OTHER PUBLICATIONS

Vasilyev et al., "Multiple Source Frequency-modulated Continuous-wave Optical Reflectometry: Theory and Experiment;" Applied Optics, vol. 49, No. 10; Apr. 1, 2010; pp. 1932-1937; 6 Pages.
PCT International Search Report and Written Opinion dated Dec. 3, 2018 for International Application No. PCT/US2018/051906; 18 Pages.
"Stepped Chirp Waveform"; Radar Basics; Radartutorial.eu; Aug. 17, 2017; 1 Page.
Mazzaro, et al.; Introduction to Stepped-Frequency Radar; ARL; ALC 204/3D013; Jun. 7, 2013; 22 Pages.
PCT International Preliminary Report dated May 14, 2020 for International Application No. PCT/US2018/051906; 10 Pages.

* cited by examiner

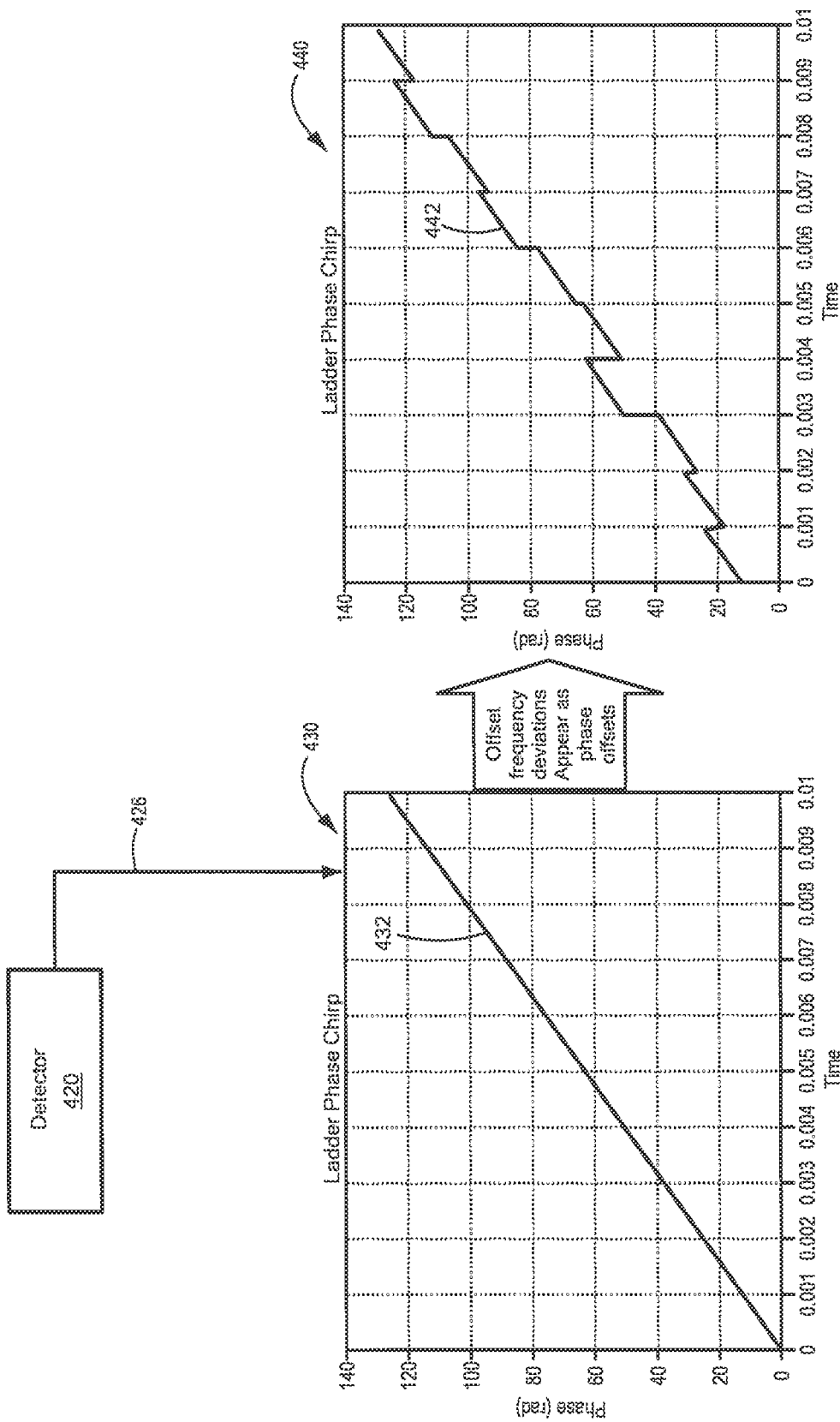

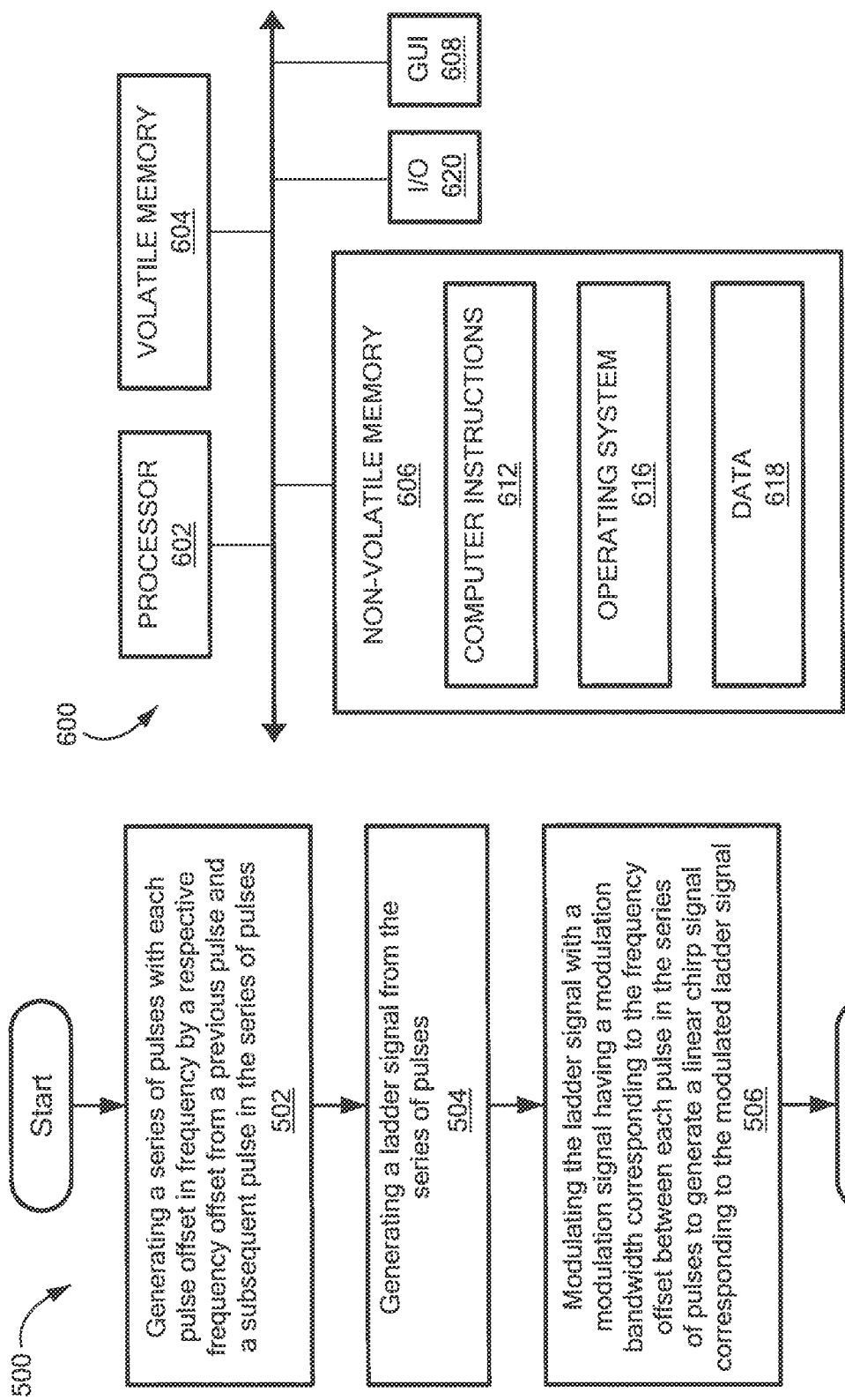

LINEAR FM CHIRP WAVEFORM FOR A LADAR TRANSCEIVER

BACKGROUND

A laser detection and ranging (LADAR) sensor, sometimes referred to as laser radar, uses laser beams to measure distances (or ranges) and instantaneous velocities. The LADAR sensor can be used to form images of scenes with a high degree of definition (e.g., 15 cm or better resolution at ranges greater 1,000 meters). LADAR sensors may be mounted on stationary objects and on vehicles such as helicopters, for example.

For LADAR applications to be able to resolve small target features (e.g., smaller than 1 cm), high bandwidth waveforms of 20 GHz or larger are often required. In addition to high bandwidth, the waveforms used typically require good coherence interval, making the fidelity requirements challenging to meet. Existing LADAR applications use complex modulator designs and circuitry to obtain the high bandwidth and meet the fidelity requirements. The complex modulator designs increase the size, weight and power needs of the LADAR system.

SUMMARY

In accordance with the concepts, systems, methods and techniques described herein a high bandwidth linear frequency modulated (FM) chirp waveform for a LADAR transceiver is provided. In an embodiment, the high bandwidth linear FM chirp waveform can be generated based at least in part by utilizing properties of an array of laser sources of the LADAR transceiver and a reduced bandwidth of a modulation signal used to modulate the signal generated by the array of laser sources.

For example, the LADAR transceiver can include an array of laser sources having a predetermined optical frequency offset between each laser source in the array such the array can generate a series of pulses with each of the pulses in the series separated by the frequency offset. In an embodiment, the frequency offset between each of the pulses in the series can be approximately the same and constant (e.g., frequency locked).

The series of pulses can be coupled to an output channel to generate ladder signal having a plurality of steps. The number of steps in the ladder signal can correspond to the number of laser sources in the array or the number of laser sources in the array generating pulses.

The ladder signal is modulated by a modulation signal having a modulation bandwidth corresponding to the frequency offset (e.g., frequency separation) between each step in the ladder signal. In an embodiment, the modulation bandwidth (also referred to as a radio frequency bandwidth of the modulation driver) can be reduced as compared to prior art LADAR systems, as the modulation bandwidth is based at least in part on the frequency offset (e.g., frequency separation) between each step in the ladder signal and not the total bandwidth of the linear FM chirp signal.

The modulation can generate a linear chirp signal having a total bandwidth corresponding to the number of laser sources in the array and the modulation bandwidth of the modulation signal. Thus, a high bandwidth linear FM chirp signal can be generated without requiring a high bandwidth modulation signal or a complex electronic modulator driver to the generate the high bandwidth modulation signal, providing size, weight and/or power savings as compared to prior art LADAR transceivers.

The modulation signal can include a plurality of frequency ramps and can be synchronized or substantially synchronized to a timing sequence of the ladder signal such that the start point (e.g., beginning of the respective frequency ramp) of each frequency ramp corresponds to at least one of the laser sources in the array initiating transmission of a pulse. Stated differently, when a new laser source transmits a pulse starting at frequency $F_n$, the modulator immediately begins to ramp the frequency of the respective pulse to $F_n$+ the frequency offset value.

The time that each frequency ramp takes to ramp the frequency of each pulse can be based at least in part on a desired total coherent chirp time. For example, in some embodiments, the time that each frequency ramp takes to ramp the frequency of each pulse may correspond to a coherent processing interval (CPI) that a particular LADAR system can support. A frequency fidelity of the linear chirp waveform can be the inverse of the particular LADAR system.

In a first aspect, method for generating a linear frequency modulated (LFM) chirp for a laser detection and ranging (LADAR) transceiver includes generating a series of pulses by an array of laser sources with each pulse offset in frequency by a respective frequency offset from a previous pulse and a subsequent pulse in the series of pulses, generating a ladder signal from the series of pulses, and modulating the ladder signal with a modulation signal having a modulation bandwidth corresponding to the frequency offset between each pulse in the series of pulses to generate a linear chirp signal corresponding to the modulated ladder signal.

The linear chirp signal can have a chirp bandwidth corresponding to the number of laser sources in the array and the modulation bandwidth of the modulation signal. In some embodiments, the series of pulses can be generated in a predetermined order by the array of laser sources. Each of the pulses can be separated from the previous and the subsequent pulse in the series of pulses by the same frequency offset.

The method may further include sequentially transmitting the series of pulses through a transmission channel to generate the ladder signal, wherein the transmission channel is a single fiber channel. A number of steps in the ladder signal can correspond to a number of laser sources in the array.

The series of pulses can be generated based on a timing sequence such that the modulation signal is synchronized to the timing sequence of the ladder signal. In some embodiments, the modulation signal can be a sawtooth waveform having a plurality of frequency ramps.

A bandwidth of each of the plurality of frequency ramps can correspond to the frequency offset between each pulse in the series of pulses. A start point of each frequency ramp in the sawtooth waveform can correspond to an initiation of a transmission of a pulse from at least one laser source in the array of laser sources.

The method may further include transmitting the linear chirp signal at a target and receiving a return signal from the target. A local oscillator (LO) signal can be generated corresponding to the linear chirp signal. The LO signal can include a time delay corresponding to a distance between the LADAR transmitter and the target. Each portion of the LO signal can correspond to a pulse generated by at least one of the laser sources in the array of laser sources.

In some embodiments, the LO signal can be mixed with the return signal and a de-chirped signal can be generated having a phase ramp corresponding to the offset frequency (Doppler shift) due to the target In another aspect, a LADAR transceiver includes an array of laser sources coupled to provide a series of pulses to a transmission channel and generate a ladder signal with each pulse is separated in frequency by a frequency offset from a previous pulse and a subsequent pulse in the series of pulses, a modulation driver coupled to provide a modulation signal to the transmission channel and generate a modulated ladder signal. The modulation signal having a modulation bandwidth corresponding to the frequency offset between each pulse in the series of pulses. The LADAR transceiver further includes an optical bench coupled to receive the modulated ladder signal and generate a linear chirp signal, wherein the linear chirp signal has a chirp bandwidth corresponding to the number of laser sources in the array and the modulation bandwidth of the modulation signal.

The LADAR transceiver may include an optical switch coupled to the array of laser sources and the optical switch can be configured to selectively activate the laser sources in the array to generate the series of pulses in a predetermined order.

Each of the pulses can be separated the previous pulse and the subsequent pulse in the series of pulses by the same frequency offset. The transmission channel is a single fiber channel. The modulation signal can be provided as a sawtooth waveform having a plurality of frequency ramps. A bandwidth of each of the plurality of frequency ramps can correspond to the frequency offset between each pulse in the series of pulses.

The LADAR transceiver may include a detector configured to receive a return signal from the target and a local oscillator (LO) signal path coupled to provide a LO signal to the detector. The LO signal can correspond to the linear chirp signal and the LO signal can include a time delay corresponding to a distance between the LADAR transceiver and the target. In some embodiments, each portion of the LO signal can correspond to a pulse generated by at least one of the laser sources in the array of laser sources. The detector can be configured to mix the LO signal with the return signal to generate a de-chirped signal having a phase ramp corresponding to the offset frequency (Doppler shift) due to the target.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which like reference numerals indicate like elements:

FIG. 4E is a first embodiment of a plot showing phase properties of a de-chirped signal generated by the LADAR transceiver of FIG. 2;

FIG. 4F is a second embodiment of a plot showing phase properties of a de-chirped signal generated by the LADAR transceiver of FIG. 2;

FIG. 5 is a flow diagram of a method for generating a linear frequency modulated (FM) chirp signal that may be performed by the LADAR transceiver of FIG. 2; and FIG. 6 is a block diagram showing a hardware architecture of a LADAR processor of the LADAR system of FIG. 2.

DETAILED DESCRIPTION

Described herein are methods and systems for generating a linear frequency modulated (LFM) chirp (herein after linear chirp signal) for a laser detection and ranging (LADAR) transceiver. The LADAR transceiver includes an array of laser sources configured to generate a series of pulses with pulse offset in frequency by a respective frequency offset from a previous pulse and a subsequent pulse in the series of pulses. A ladder signal can be generated from the series of pulses and modulated with a modulation signal having a modulation bandwidth corresponding to the frequency offset between each pulse to generate the linear chirp signal. The linear chirp signal can have a chirp bandwidth corresponding to the number of laser sources in an array and a modulation bandwidth of the modulation signal. Thus, by modifying the number of laser sources in the array and/or the modulation bandwidth of the modulation signal, the linear chirp signal can be generated having any bandwidth required for a particular application of the respective LADAR transceiver.

Figure 1:
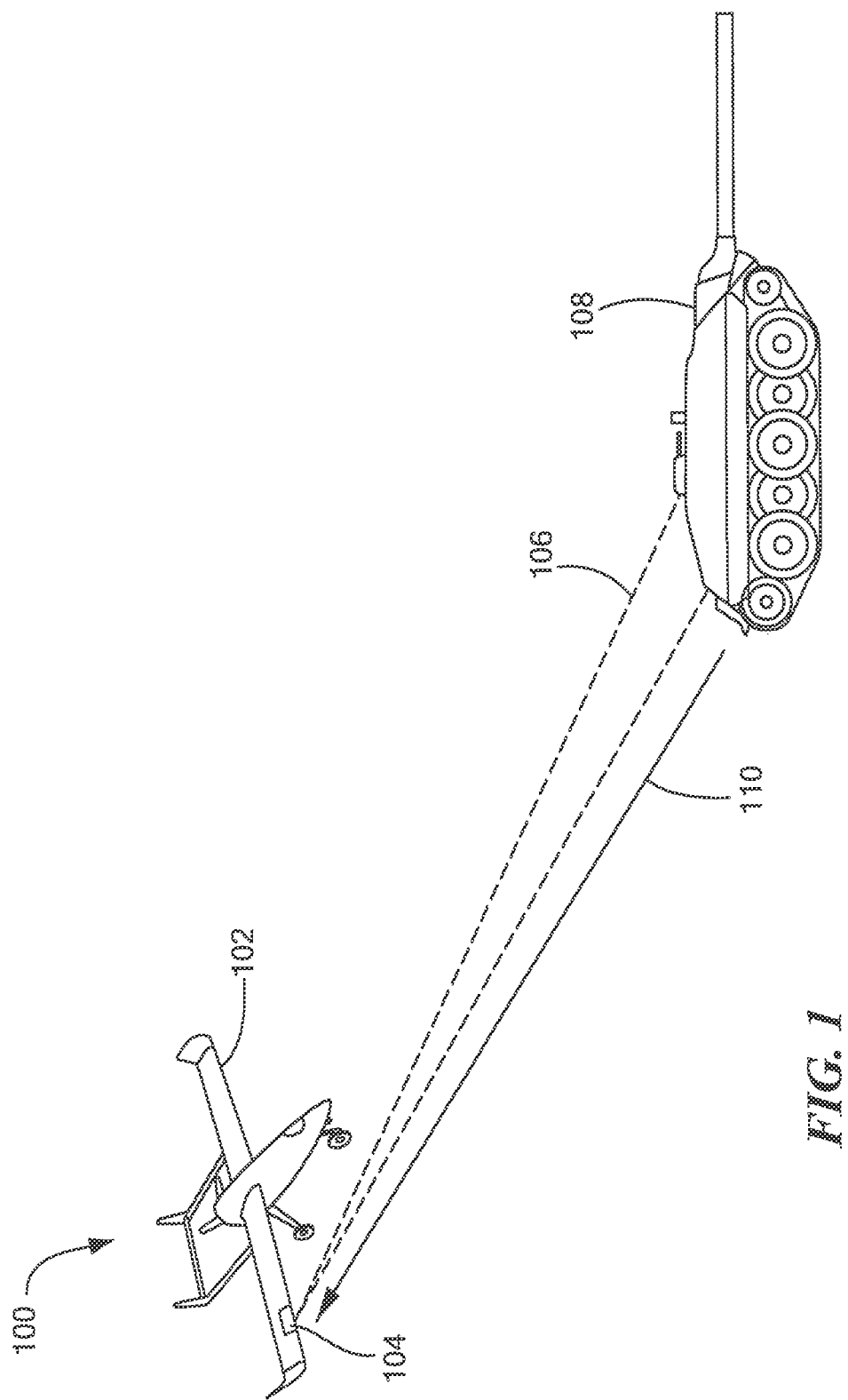
FIG. 1 is a diagram of an illustrative application of a LADAR transceiver in accordance with described embodiments.

Now referring to FIG. 1, an illustrative application of a LADAR system 100 that includes a LADAR transceiver 104 mounted on a targeting system 102, here an unmanned aerial vehicle (UAV) is provided. Although targeting system 102 is shown mounted on an UAV, it should be appreciated that LADAR transceiver 104 can be mounted to or otherwise employed on mobile systems such as a vehicle, a watercraft, an aircraft, motor vehicles, self-driving vehicles (or other form of motorized machine that can be used to transports people, goods, etc.) or may be implemented in stationary systems, or other portable systems.

LADAR transceiver 104 can be coupled to (e.g., communicatively or directly) or be a component of targeting system 102 for various applications, such as but not limited to, detecting one or more objects, or targets in the field of view of targeting system 102. As will be apparent to those of ordinary skill in the art, LADAR transceiver 104 is also suitable for use in many different types of applications including but not limited to any land-based vehicle marine applications in which LADAR transceiver 104 can be disposed on a boat, ship or other sea vessel and may also find use in aerial vehicles (as illustrated in FIG. 1). LADAR transceiver 104 is configured to operate at frequencies suitable for applicable operation (e.g. marine, land or airborne operation).

In the example embodiment of FIG. 1, LADAR transceiver 104 can transmit a LADAR transmission signal (hereinafter transmission signal) 106 at a target 108 to measure various properties of the target 108. For example, LADAR transceiver 104 can be configured to measure a distance between itself and target 108 (e.g., a range from transceiver 104 to target 108), a motion of target 108 (e.g., with respect to LADAR transceiver 104), or properties of different portions of target 108 (e.g., the hatch, the turret, the main gun, the wheels, etc.). In one embodiment, LADAR transceiver 104 can resolve target features smaller than 1 cm using the linear chirp signals 106 described herein. In other embodiments, LADAR transceiver 104 can resolve target features smaller than 1 mm using the linear chirp signals 106 described herein. It should be appreciated that the bandwidth of a LADAR transceiver 104 can be selected based in part on a desired resolution.

Transmission signal 106 can be formed as a linear chirp signal and transmitted at target 108 to illuminate one or more portions of target 108. At least a portion of transmission signal 106 impinges upon and is reflected by target 108 as return signal 110. At least a portion of return signal 110 is received by LADAR transceiver 104. Return signal 110 may have the same general waveform as transmission signal 106 but shifted in time and frequency (e.g., due to the Doppler effect).

Figure 2:
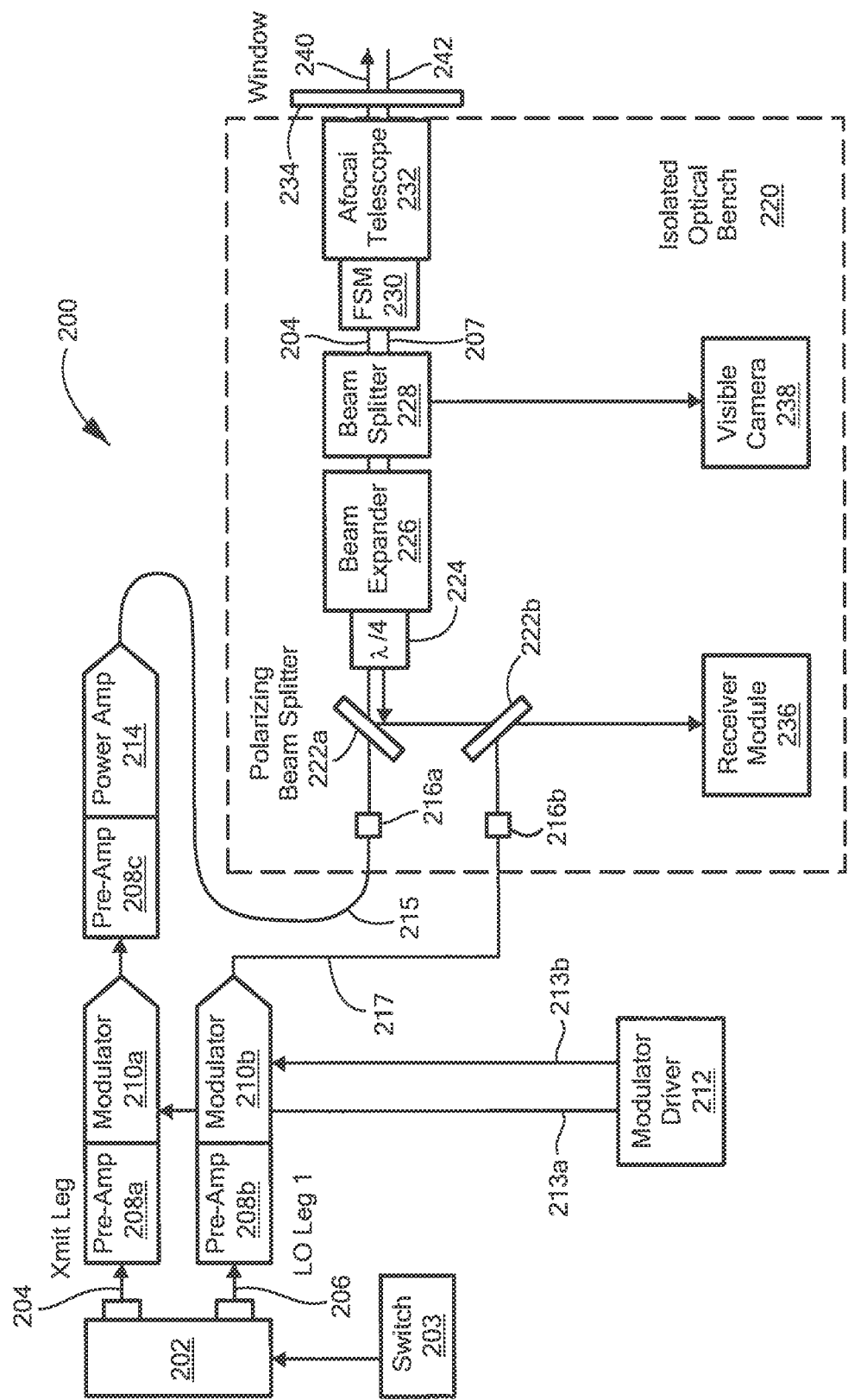
FIG. 2 shows a block diagram of an illustrative LADAR transceiver in accordance with described embodiments.

Now referring to FIG. 2, a block diagram of a LADAR transceiver 200 is provided. LADAR transceiver 200 may be the same as or substantially similar to LADAR transceiver 104 of FIG. 1.

LADAR transceiver 200 includes an array of laser sources 202 (hereinafter "array"). In an embodiment, laser sources of array 202 may be provided as or include a variety of different types of lasers, including but not limited to gas based lasers, coherent diode lasers, or any device configured to emit light through a process of amplification by stimulated emission of radiation.

Outputs of array 202 are coupled to at least two transmission channels, here a transmit signal path 204 and a local oscillator (LO) signal path 206. In an embodiment, the transmit signal path 204 can coupled array 202 to an optical bench 220 and can transmit a waveform generated by array 202 and provide it to optical bench 220. As will be discussed in greater detail below, the waveform may correspond to a signal transmitted by optical bench 220. LO signal path 206 can coupled array 202 to optical bench 220 and can transmit a waveform generated by array 202 and provide it optical bench 220. As will be discussed in greater detail below, the waveform may be mixed with a return signal received at optical bench 220.

Array 202 can generate a series of long pulses which constitute the frequency ladder with each of the pulses contiguous to, creating on continuous power frequency ladder. a previous pulse and a subsequent pulse in the series in the frequency domain by a frequency offset. For example, in some embodiments, the frequency offset between each of the pulses in the series of pulses can be the same and thus equidistant in the frequency domain between each pulse. In an embodiment, a frequency offset of each laser source in array 202 can be measured and adjusted in an internal lock loop of array 202.

In some embodiments, a switch 203 (e.g., optical switch) can be coupled to array 202 to selectively activate the laser sources in array 202 to generate the series of pulses in a predetermined or random order. In some embodiments, the switch 203 can use a timing sequence to sequentially activate the laser sources and generate the series of pulses.

Array 202 is coupled to provide the series of pulses to each of transmit signal path 204 and LO signal path 206 to generate a ladder signal on each of transmit signal path 204 and LO signal path 206. The ladder signal can be provided to first and second pre-amplifiers 208a, 208b and first and second modulators 210a, 210b.

For example, and as illustrated in FIG. 2, on transmit signal path 204, an input of a first pre-amplifiers 208a is coupled to an output of array 202 to receive a ladder signal. An output of first pre-amplifiers 208a is coupled to an input first modulators 210a. On LO signal path 206, an input of a second pre-amplifiers 208b is coupled to an output of array 202 to receive a ladder signal. An output of second pre-amplifiers 208b is coupled to an input second modulators 210b.

Outputs of a modulator driver 212 are coupled to inputs of first and second modulators 210a, 210b to provide a modulation signal. The modulation signal can have a radio frequency (RF) bandwidth (also referred to herein as a modulation bandwidth) that is approximately the same as the frequency offset between each of the pulses in the series of pulses. In an embodiment, modulator driver 212 can provide a first modulation signal 213a having no time delay to first modulator 210a and a second modulation signal 213b having a time delay corresponding to a distance between LADAR transceiver 200 and a target. For example, the time delay may be the same as or substantially similar to the time it takes a transmission signal transmitted from LADAR transceiver 200 to reach the respective target and be received back (e.g., return signal) at LADAR transceiver 200. The time delay will be discussed in greater detail below with respect to method 500 of FIG. 5.

First modulator 210a can combine the first modulation signal 213a and the ladder signal (i.e., modulate the ladder signal with the modulation signal) to generate a modulated ladder signal. In an embodiment, the modulated ladder signal may correspond to a linear frequency modulated (FM) chirp signal 215 having a bandwidth corresponding the number of laser sources in array 202 and the RF bandwidth of the modulation signal.

Second modulator 210b can combine the second modulation signal 213b and the ladder signal (i.e., modulate the ladder signal with the modulation signal) to generate a time delayed LO signal 217. In an embodiment, the time delayed LO signal may be similar to the linear chirp signal 215, but includes the respective time delay.

In some embodiments, transmit signal path 204 may include a third pre-amplifier 208c and a power amplifier 214. For example, an output of first modulator 210a can be coupled to an input of third pre-amplifier 208c and an output of third pre-amplifier 210c is coupled to an input of power amplifier 214. In an embodiment, power amplifier 214 and first, second and third pre-amplifiers 208a, 208b, 208c can be configured to amplify a received signal to strengthen the signal for transmission and/or further signal conditioning.

The linear chirp signal 215 can be provided to an optical bench 220 through the transmit signal path 204 and the time delayed LO signal 217 can be provided to optical bench 220 through LO signal path 206. It should be appreciated that following example embodiment of optical bench 220 is one example embodiment and that optical bench 220 can include a variety of different components to perform signal conditioning for signals to be transmitted and/or received signals for LADAR applications. For example, in other embodiments, one or more components of optical bench 220 can be replaced with different components to perform similar functions or omitted to provide the required signal conditioning. Those of ordinary skill in the art will understand how to select the particular components of optical bench 220 to perform signal conditioning for a particular application of a LADAR transceiver.

Still referring to optical bench 220 of FIG. 2, optical bench 220 is configured to provide transmit functions, receive functions or both transmit functions, receive functions and thus includes the transmit signal path 204, LO signal path 206 and a return signal path 207. In an embodiment, each of the components of optical bench 220 can be disposed on or otherwise coupled to the transmit signal path 204, LO signal path 206, and/or return signal path 207 to perform signal conditioning.

For transmit functions, and referring to the transmit signal path 204, an output of power amplifier 214 provides the linear chirp signal 215 to an input of a first fiber collimator 216a. First fiber collimator 216a can be configured to direct the linear chirp signal 215 to a specific direction. An output of first fiber collimator 216a is coupled to an input of quarter wave plate ($\lambda$/4) 224 (e.g., quarter-wave plate that changes the polarization of the light to be circularly polarized).

The output of first fiber collimator 216a is coupled to an input of a polarizing beam splitter 222a. In an embodiment, beam splitter 222a can be configured to allow the polarized transmitter power of the linear chirp signal 215 to go through and be received at an input of quarter wave plate ($\lambda$/4) 224. An output of quarter wave plate ($\lambda$/4) 224 is coupled to an input of a beam expander 226. An output of beam expander 226 is coupled to an input of a dichroic beam splitter 228. An output of dichroic beam splitter 228 is coupled to an input of a fast steering mirror 230. In an embodiment, fast steering mirror 230 can be configured to cancel any small platform motion that may be required for a particular application of the LADAR transceiver 200. An output of fast steering mirror 230 is coupled to an input of telescope 232 (e.g., afocal telescope). In some embodiments, telescope 232 may transmit a transmission signal 240 (i.e., conditioned linear chirp signal) through a window 234 and at a target, such as target 108 of FIG. 1. Window 234 can be configured to isolate the interior of the platform to the exterior air flow. In other embodiment, telescope 232 may transmit transmission signal 240 (i.e., conditioned linear chirp signal) at a target, such as target 108 of FIG. 1. Transmission signal 240 may be the same as or substantially similar to transmission signal 106 of FIG. 1.

Now referring to receive functions of LADAR transceiver 200 and the return signal path 207, a return signal 242 can be received at telescope 232 through window 234. Return signal 242 may correspond to a portion of transmission signal 240 received back from a target, such as target 108 of FIG. 1. For example, transmission signal 240 (e.g., transmitted light) can propagate to a target, where the light in transmission signal 240 is scattered (reflected) back. Some of the reflected light can be captured by telescope 232, through window 234.

An output of telescope 232 is coupled to an input of fast steering mirror 230. An output of fast steering mirror 230 is coupled to an input of beam splitter 228. For receive functions, beam splitter 228 can be configured to separate any visible or infrared (IR) light from the laser light using the fact that they have different spectral distribution. For example, the laser light can be extremely narrow, and that is designed to go through, while the reaming portion of the return signal 242 can be much more broadband and usually in a different part of the spectrum, which is reflected. Such that an output of beam splitter 228 is coupled to an input of a camera 238 (e.g., visible or IR camera). In an embodiment, camera 238 may be provided as various types of imaging devices, displays and/or user interfaces.

An output of beam splitter 228 is coupled to an input of beam expander 226. Beam expander 226 can be configured to collimated return signal 242 back down to the size of the optics or otherwise compress return signal 242. An output of beam expander 226 is coupled to an input of quarter wave plate ($\lambda$/4) 224. Quarter wave plate ($\lambda$/4) 224 can be configured to changes the polarization of return signal 242 back from a circular polarization to a linearly polarized signal, but at a 90-degree difference as compared to transmission signal 240. Quarter wave plate ($\lambda$/4) 224 can provide the return signal 242 to polarizing beam splitter 222a, which reflects return signal 242 (rather than transmit because the polarization is now orthogonal to the transmitted light) into a receiver channel.

Return signal 242 can be combined with time delayed LO signal 217 from LO signal path 206 through second fiber collimator 216b. For example, and as illustrated in FIG. 2, second beam splitter 222b can be configured to reflect portions of time delayed LO signal 217 and return signal 242 to a receiver module 236. In an embodiment, second beam splitter 222b may be provided as a 90/10 beam splitter, where 90% of the received light from return signal 242 is transmitted towards a receiver module 236 (e.g., detector) and 10% of the received light from time delayed LO signal 217 is transmitted towards receiver module 236. It should be appreciated however, that other forms of beam splitters may be provided as second beam splitter 222b.

Receiver module 236 is coupled to receive portions of the time delayed LO signal 217 from the LO signal path 206 through second beam splitter, 222b and second fiber collimator 216b. Receiver module 236 may also be referred to herein as a detector. As illustrated in FIG. 2, an output of second modulator 210b is coupled to an input of second fiber collimator 216b to provide the time delayed LO signal 217. An output of second fiber collimator 216b can provide the time delayed LO signal 217 to second beam splitter, 222b, which can be disposed to reflect the or otherwise direct portions of time delayed LO signal 217 to an input of receiver module 236.

In an embodiment, receiver module 236 (or detector) can be configured to compare the return signal 242 and the time delayed LO signal 217 to generate a de-chirped signal having a phase ramp corresponding to the uncompensated Doppler of the return signal 240. In some embodiments, receiver module 236 can be configured to combine the 90% of the return signal 242 received and the 10% of the time delayed LO signal 217 and combine them to perform heterodyne detection. It should be appreciated that although the 90/10 ratio is described here, other ratios can be used based at least in part on a particular application of LADAR transceiver 200. As will be discussed in greater detail below with respect to method 500 of FIG. 5, receiver module 236 can be configured to determine if the series of pulses in linear chirp signal 215 and thus transmission signal 240 are locked in frequency separation by analyzing the phase properties of the de-chirped signal.

Figure 3:
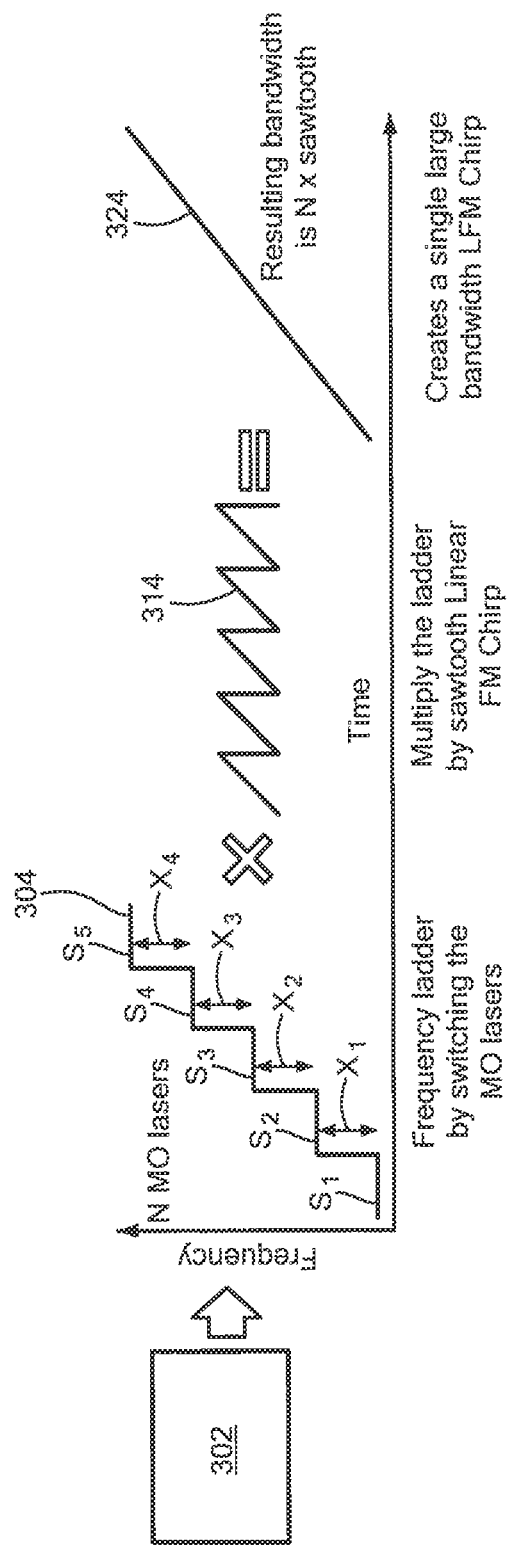
FIG. 3 shows a plot illustrating the modulation of a ladder signal to generate a linear chirp signal.

Now referring to FIG. 3, an illustration showing the generation of a linear chirp waveform 324 is provided. In FIG. 3, an array 302, which may be the same as or substantially similar to array 202 of FIG. 2, can include a plurality of laser sources with each of the laser sources configured to generate a pulse of light. The laser sources can be configured to generate the pulses at different frequencies such that array 302 generates a ladder signal 304 (e.g., frequency ladder signal). In some embodiments, the pulses can be generated such that they are separated in the frequency domain by the same amount. Stated differently, a frequency offset between each pulse in the series of the pulse can be the same (i.e., equidistant).

For example, and as illustrated in FIG. 3, ladder signal 304 includes a plurality of steps, here five, $S_1$, $S_2$, $S_3$, $S_4$, $S_5$.

Each of steps $S_1$, $S_2$, $S_3$, $S_4$, $S_5$ may correspond to a pulse in the series of pulses generated by array 302. Each of steps, $S_1$, $S_2$, $S_3$, $S_4$, $S_5$ can be separated by a frequency offset $X_1$, $X_2$, $X_3$, $X_4$. In an embodiment, the frequency offsets $X_1$, $X_2$, $X_3$, $X_4$ can be approximately the same such that each of steps $S_1$, $S_2$, $S_3$, $S_4$, $S_5$ are separated by the same amount in the frequency domain.

Ladder signal 304 can be modulated by a modulation signal 314 having a bandwidth (i.e., modulation bandwidth) approximately equal to the frequency offset between each of the pulses in series of pulses generated by array 302. For example, in an embodiment, the modulation bandwidth can be approximately equal to the frequency offsets $X_1$, $X_2$, $X_3$, $X_4$ between each of steps $S_1$, $S_2$, $S_3$, $S_4$, $S_5$. In some embodiments, the modulation signal 314 may be provided as a sawtooth linear FM chirp.

Modulation signal 314 can be synchronized with ladder signal 304 such that the result of the modulation produces linear chirp signal 324 (e.g., contiguous single linear chirp ramp). A chirp bandwidth of linear chirp signal 324 can correspond to the number of laser sources in array 302 and the modulation bandwidth of the modulation signal (i.e., N laser sources X modulation bandwidth). Thus, a linear chirp signal 324 can be generated having a high bandwidth can be generated using a modulation bandwidth that is reduced or less than the chirp bandwidth of linear chirp signal 324. For example, in one embodiment, linear chirp signal 324 can be generated having a chirp bandwidth of 20 GHz using an array having 10 laser sources and a modulation signal having a modulation bandwidth of 2 GHz. The details of each of ladder signal 304, modulation signal 314 and linear chirp signal 324 will be described below in greater detail with respect to method 500 of FIG. 5.

Now referring to FIGS. 4A-4F, a series of plots are provided to illustrate the receive functions of a LADAR transceiver as described herein. The laser sources of an array (i.e., array 202 of FIG. 2, array 302 of FIG. 3) can be frequency locked to the desired frequency offset such that they maintain an equidistant frequency lock between each of the pulses generated by the respective laser sources.

Figure 4A:
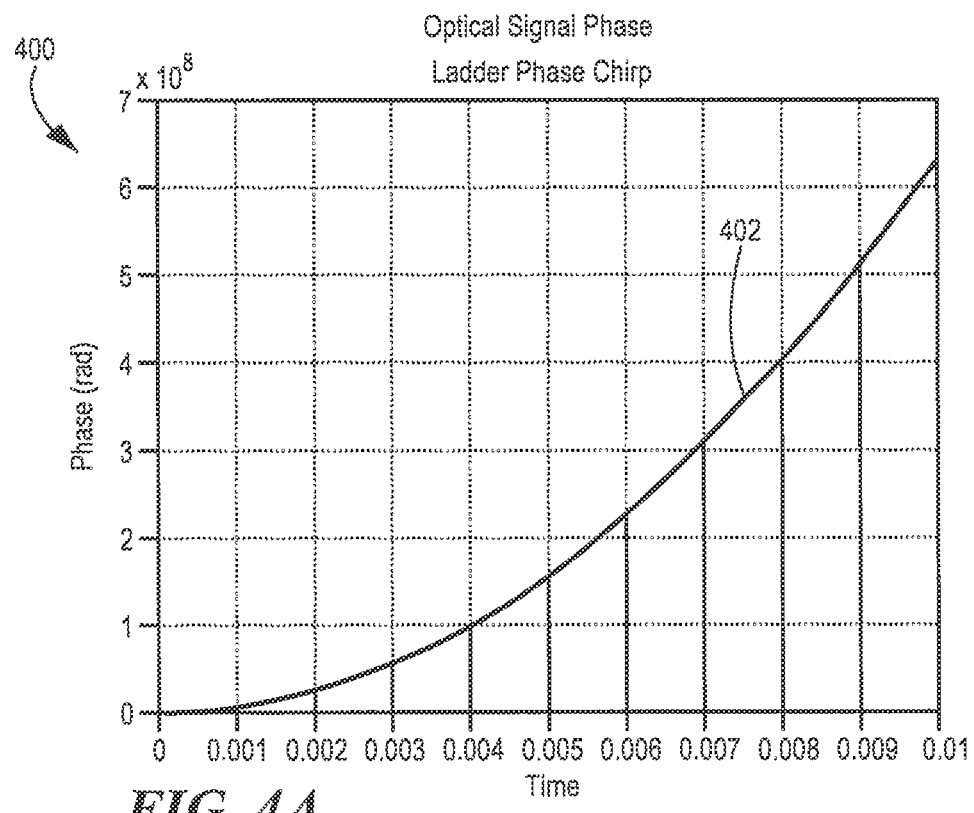
FIG. 4A is a plot showing phase properties of a linear chirp signal generated by the LADAR transceiver of FIG. 2.

For example, and now referring to FIG. 4A, is a plot 400 showing phase properties of a linear frequency chirp signal 402 having non-constant phase ramp (e.g., quadratic slope). The slope of linear chirp signal 402 may indicate differences in phase references from one laser source to another laser source in a respective array. In an embodiment, the phase reference from one laser source to another laser source in a respective array can be ignored for embodiments described herein but an equidistant frequency offset between each of the laser sources in the array can be maintained.

Figure 4B:
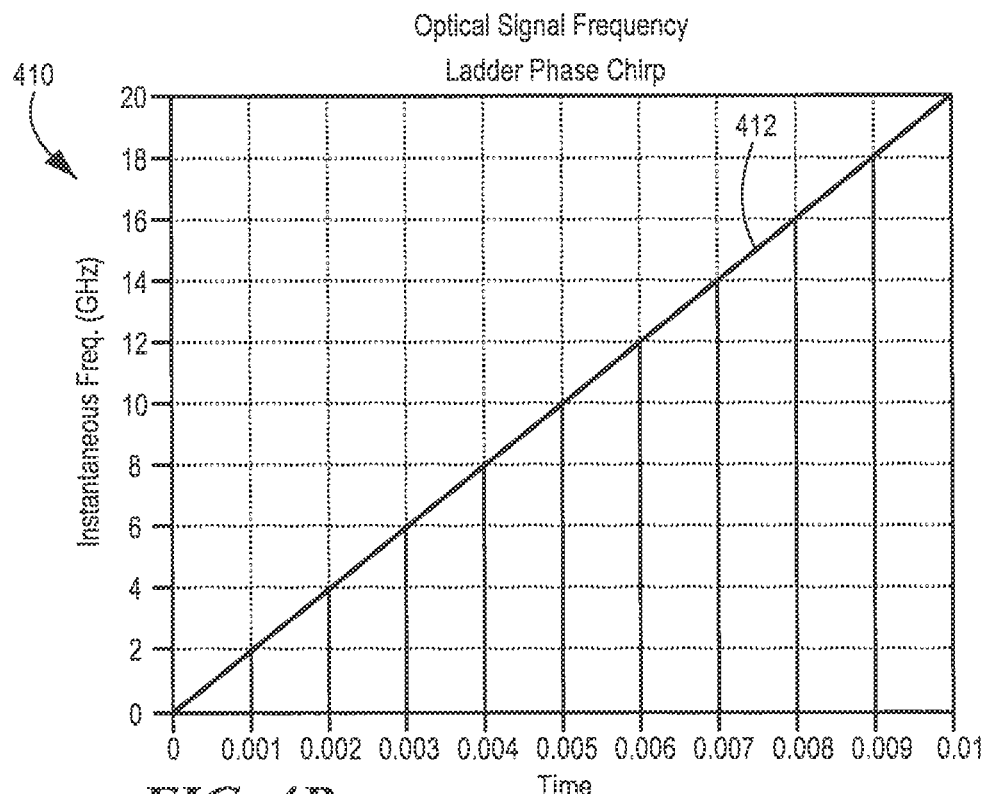
FIG. 4B is a plot showing frequency properties of a linear chirp signal generated by the LADAR transceiver of FIG. 2.

Now referring to FIG. 4B, a plot 410 is provided showing frequency properties of a linear chirp signal 412 having a constant slope. The constant slope indicates an equidistant frequency offset between each of the laser sources in the array. Linear chirp signal 412 may be the same as or substantially similar to linear chirp signal 324 of FIG. 3.

To generate and/or monitor the frequency lock between the laser sources, circuitry may be provided, such as an electronic loop coupled to each laser source that compares a return signal to a time delayed LO signal. For example, and referring to FIG. 4C, a diagram illustrates a detector 420, which may be the same as or substantially similar to receiver module 236 of FIG. 2, can be disposed within a LADAR transceiver to receive a time delayed LO signal 422 and a return signal 424. Time delayed LO signal 422 may be the same as or substantially similar to time delayed LO signal 217 of FIG. 2 and return signal 424 may be the same as or substantially similar to return signal 242. In some embodiments, return signal 424 may be a glint return, for example, such as a reflection from a reflective shiny sphere. In such an embodiment, a Fourier transform can be performed on the return signal to verify that it is a transform limited result.

Figure 4C:
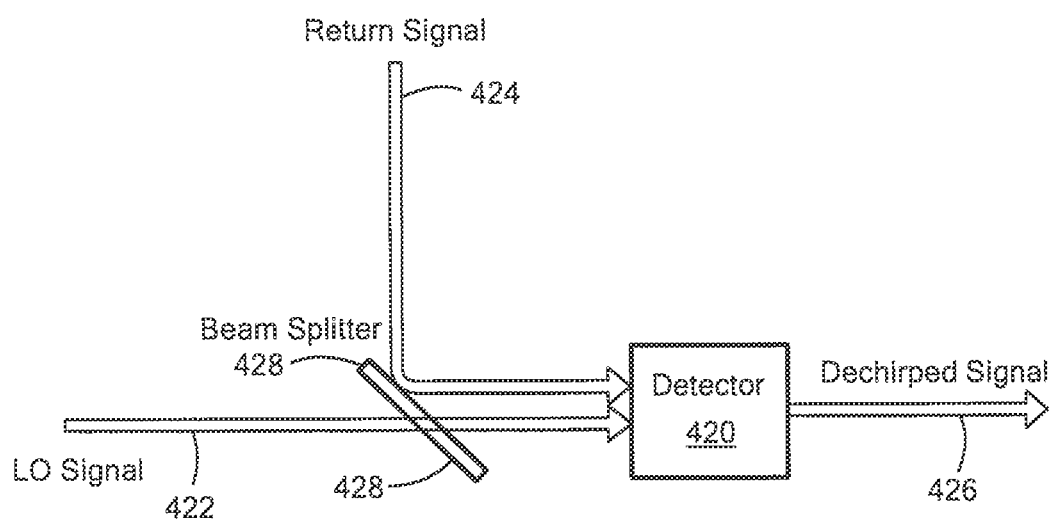
FIG. 4C is a diagram illustrating a detector of the LADAR transceiver of FIG. 2 comparing a return signal and a time delayed local oscillator (LO) signal.
Figure 4D:
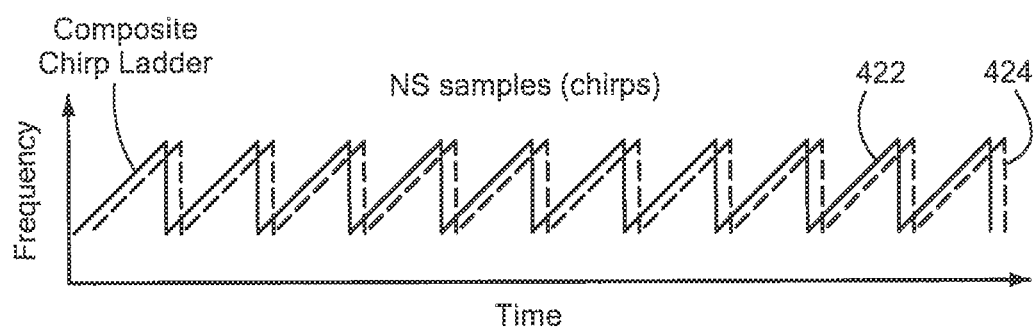
FIG. 4D is a plot comparing a return signal to a time delayed LO signal.

As illustrated in FIG. 4C, time delayed LO signal 422 and return signal 424 can be provided to detector 420 through a beam splitter 428. Beam splitter 428 may be the same as or substantially similar to second beam splitter 222b (e.g., 90/10 beam splitter) of FIG. 2. Detector 420 can be configured to compare time delayed LO signal 422 and return signal 424 to generate a de-chirped signal 426. For example, and briefly referring to FIG. 4D, time delayed LO signal 422 is shown with return signal 424. In an embodiment, time delayed LO signal 422 can be the same as or substantially similar to a linear chirp signal transmitted at a target, but include a time delay and a frequency shift to reflect a roundtrip delay and velocity from the respective LADAR transceiver to the target. In the illustrative embodiment of FIG. 4D, time delayed LO signal 422 is illustrated offset from return signal 424 for clarity, however, it should be appreciated that in some embodiments, the time delay may be generated such that time delayed LO signal 422 is substantially similar to return signal 424. Detector 420 can mix (e.g., combine, heterodyne) time delayed LO signal 422 with return signal 424 to generate a continuous tone de-chirped signal 426.

De-chirped signal 426 may include a phase ramp that is substantially similar to a linear chirp signal (e.g., linear chirp signal 324 of FIG. 3) transmitted by the LADAR transceiver. For example, and as shown in graph 430 of FIG. 4E, the phase ramp 432 may include a constant phase term (e.g., constant slope). The phase ramp 432 can be a result of the frequency offset used to generate the ladder signal (e.g., ladder signal 304 of FIG. 3) generated by the array of laser sources. In an embodiment, if the frequency offset between each of the steps in the ladder signal is equidistant between each step (i.e., the laser sources in the array are in frequency lock), the resulting phase term of de-chirped signal 426 remains constant across a chirp.

For example, and now referring to FIG. 4F, a graph 440 shows a non-constant phase ramp 442 of a de-chirped signal. The phase offsets (or deviations) in phase ramp 442 are the result of one or more steps in a ladder signal being separated in the frequency domain by different frequency offsets from one or more other steps in the same ladder signal. Stated differently, when the frequency lock between the series of pulses is not maintained and one or more steps are separated by different frequency offsets, the deviations in the frequency offsets result in phase offsets in a de-chirped signal generated during a detection process. Thus, to monitor or verify that the frequency offset between the laser sources in the array have maintained the frequency lock, the properties of the phase ramp can be compared to the linear chirp signal, as will be discussed in greater detail below with respect to method 500 of FIG. 5.

Now referring to FIG. 5, a method 500 for generating a linear frequency modulated (FM) chirp signal for a LADAR transceiver that may be performed by LADAR transceiver 104 of FIG. 1 and/or LADAR transceiver 200 of FIG. 2 is provided. Method 500 begins at block 502 by generating a series of pulses by an array of laser sources (e.g., array 202 of FIG. 2, array 302 of FIG. 3). The pulses can be generating randomly or in a variety of different orders. For example, in some embodiments, the series of pulses can be generated based on a timing sequence such that pulses are generated in a sequential order with a predetermined time period between each of the pulses. In some embodiments, the time between the generation of each pulse may correspond to a coherent processing interval (CPI) of the respective LADAR transceiver.

In some embodiments, a switch (e.g., switch 203 of FIG. 2) can be coupled to the array and each of laser sources in the array to selectively activate the laser sources and generate the series of pulses. For example, the switch can be provided as an optical switch and the laser sources can be sequentially switched across the optical switch to generate the series of pulses.

The pulses can be generated at one or more different frequencies. In some embodiments, the pulses can be generated such that they are spaced (e.g., offset) equidistant from a previous pulse and a subsequent pulse in the frequency domain. Stated alternatively, a frequency offset between each of the pulses in the series of the pulses can be approximately the same such that the laser sources are referred to as being in frequency lock (i.e., the frequency offset between each of the pulses in the series of the pulses is equidistant and constant).

At block 504, a frequency ladder signal (or more simply "ladder signal") is generated from the series of pulses. In an embodiment, the series of pulses can be sequentially transmitted through a single channel based at least in part on the order of when the respective pulse was generated and/or what frequency the pulse was generated at to generate the ladder signal. In some embodiments, the single channel (or transmission channel) may be provided as a fiber channel. The transmission channel may be provided as a transmit signal path and/or a LO signal path (e.g., transmit signal path 204 and LO signal path 206 of FIG. 2). The transmit signal path is coupled between the array and an optical bench. The LO signal path will be described in greater detail below.

The ladder signal may include a series of steps with each step corresponding to a pulse in the series of pules. Each of the steps can be separated in the frequency domain by the frequency offset (e.g., to provide a graph of the generated signal having a ladder shape as illustrated in FIG. 3). Thus, a number of steps in the ladder signal may be equal to the number of laser sources generating pulses and a step size between each step may correspond the frequency offset.

At block 506, the ladder signal is modulated by a modulation signal having a RF bandwidth (referred to herein as modulation bandwidth) corresponding to the frequency offset between each pulse in the series of pulses. The modulation signal can be generated such that the properties of the modulation bandwidth correspond to the properties of the pulses in the series of pulses and the timing sequence corresponds to the timing sequence of the series of pulses.

In an embodiment, the modulation signal can be provided as a sawtooth linear FM chirp signal. The sawtooth linear chirp signal (sawtooth waveform) can include a plurality of frequency ramps used to modulate the frequency of each of the pulses in the series of pulses to generate a single linear chirp. The modulation bandwidth can be generated such that it bridges the frequency gap between each pulse in the series of pulses (or each step in the ladder signal). In an embodiment, the modulation bandwidth can be approximately equal to frequency offset between each pulse in the series of pulses. Thus, the bandwidth of each of the frequency ramps in the modulation signal can be approximately equal to frequency offset between each pulse in the series of pulses.

The modulation signal can be generated such that it is approximately synchronized with the ladder signal and a timing sequence of the series of pulses can correspond to a timing sequence of the frequency ramps in the modulation signal. For example, each frequency ramp in the modulation signal can be synchronized with each pulse in the series and synchronized with each step of the ladder signal. Stated differently, when a laser source transmits a new pulse (initiates a pulse) corresponding to a new step in the ladder signal, with the new pulse starting at a frequency $F_n$, the modulation signal can be synchronized to the ladder signal such that the modulation signal initiates a new ramp at the approximately the same time to ramp the frequency of the respective new pulse to $F_n+2$ GHz.

The time that all the frequency ramps, which constitutes the high bandwidth waveform has to be at least as short as the desired coherent processing interval, CPI, in order for the receiver response to be able to utilize the whole extent of the bandwidth for range resolution. The CPI is a function of the desired LADAR performance, such as the synthetic aperture resolution, or vibration frequency bandwidth. For example, in some embodiments, the time that all the frequency ramps take to generate the high bandwidth waveform may correspond to a single or fraction of the coherent processing interval (CPI) that a particular LADAR system can support. A frequency fidelity of the linear chirp waveform can be the inverse of the particular LADAR system.

In synthetic aperture modality, the CPI is determined by the relative rotational motion of the target, and the desired cross-range resolution; the longer the CPI the higher the resolution. Inversely, in vibration sensing, the CPI is effectively the sampling time, and the longer it is, the lower is the maximum acoustic frequency that can be sampled, though usually longer CPI yield better signal to noise results.

In some embodiments, the modulation signal can be generated by a modulation driver. For example, the array can provide the ladder signal to a transmit signal path and a LO signal path (e.g., transmit signal path 204, LO signal path 206 of FIG. 2). The ladder signal provided to each signal path can be substantially the same signal. The transmit signal path and LO signal path can each include a modulator (e.g., modulators 210a, 210b of FIG. 2) configured to modulate the received ladder signal with a modulation signal. The modulation signal can be provided by the modulation driver (e.g., modulation driver 212 of FIG. 0.2) coupled to each of the transmit signal path and LO signal path.

The modulator disposed on the transmit signal path can combine the modulation signal from the modulation driver with the ladder signal and generate the linear chirp signal. In an embodiment, the linear chirp signal can be a single linear chirp having a bandwidth corresponding to the number of laser sources in the array and the modulation bandwidth of the modulation signal. For example, in one embodiment of an array having 10 laser sources can be generate a series of pulses and a ladder signal. The ladder signal can be modulated by a modulation signal having a modulation bandwidth of 2 GHz to generate a linear chirp signal having a 20 GHz bandwidth (e.g., 10×2 GHz=20 GHz). It should be appreciated however that the number of laser sources and/or the modulation bandwidth of the modulation can be scaled to generate a linear chirp signal having any desired bandwidth. Indeed, a trade-off can be made by modifying the number of laser sources in the array and/or modifying the modulation bandwidth of the modulation signal to generate a linear chirp signal having a desired bandwidth based at least in part on a particular application of the LADAR transceiver.

The linear chirp signal can be provided to an optical bench of the LADAR transceiver for various signal conditioning techniques can be performed on the linear chirp signal to prepare the linear chirp signal to be transmitted (e.g., laser beam) from the LADAR transceiver as a LADAR transmission signal (e.g., transmission signal 106 of FIG. 1). In an embodiment, the LADAR transceiver can emit the transmission signal at a target (e.g., target 108 of FIG. 1).

At least a portion of the transmission signal may be impinged upon and reflected by the target as a return signal. The return signal can be received by the optical bench of the LADAR transceiver (e.g., optical bench 220 of LADAR transceiver 200 of FIG. 2). The optical bench can perform various signal conditioning techniques on the return signal to prepare the received return signal for detection techniques and/or to be provided to different optics systems, such as but not limited to imaging units and displays (e.g., camera, user interfaces, etc.) that are coupled to provided as a component of the LADAR transceiver.

For example, in some embodiments, to detect target features for imaging or recognition purposes, the optical bench can include a detector (e.g., receiver module 236 of FIG. 2). The detector can compare the return signal to a time delayed LO signal to generate a de-chirped signal. The time delayed LO signal can be substantially the same as the ladder signal used to generate the transmission signal, however the time-delayed LO signal includes a time delay.

For example, and as stated above, the modulation signal can be provided by a modulation driver (e.g., modulation driver 212 of FIG. 0.2) coupled to each of the transmit signal path and LO signal path. However, the modulation driver can provide a time delayed modulation signal to the modulator disposed on the LO signal path. Thus, the ladder signal provided to the LO signal path can be modulated by a time delayed modulation signal to generate the time delayed LO signal.

In an embodiment, the time delay can correspond to (e.g., approximately equal to) a round trip time period it takes one or more portions of a transmission signal transmitted from the LADAR transceiver to reach a respective target and return to the LADAR transceiver. For example, the return signal may have the same general waveform as transmission signal but shifted in time and frequency (e.g., due to the Doppler effect).

The time delay can be used to synchronize the return signal to the time delayed LO signal such that each portion in the received return signal in compared with (e.g., mixed with) a corresponding step in the ladder signal that was used to generate the linear chirp signal and transmission signal. For example, each portion of the received return signal can be mixed with a portion of the time delayed LO signal that is substantially the same as itself. The information corresponding to the target is different between the received return signal and the time delayed LO signal. This information can be recorded. It should also be appreciated that the phase relationship of the lasers in the array used to generate each step of the ladder signal does not affect the measurement, but the frequency offset does.

The de-chirped signal can include a phase term (or phase ramp) as a result of the frequency offset between the return signal and the time delayed LO signal.

If the frequency offset between each of the pulses in the series of pulses has not remained constant and equal, the corresponding phase term in the de-chirped signal can include one or phase offsets (or deviations) that can degrade the quality of a return signal. Thus, in an embodiment, the detector (or a second detector) can identify phase offsets in the phase term of a de-chirped signal to determine if the frequency offset has been maintained.

Referring to FIG. 6, in some embodiments, a LADAR transceiver (e.g., LADAR transceiver 200 of FIG. 2) may include a LADAR processor that can be implemented as one or more computers. Computer 600 may include processor 602, volatile memory 604 (e.g., RAM), non-volatile memory 606 (e.g., a hard disk drive, solid state drive such as a flash drive, a hybrid magnetic and solid state drive, etc.), graphical user interface (GUI) 608 (e.g., a display or touchscreen, etc.) and input/output (I/O) device 620 (e.g., a mouse, a keyboard, a touchscreen, and so forth). Non-volatile memory 606 stores computer instructions 612, an operating system 616 and data 618 such that, for example, the computer instructions 612 are executed by the processor 602 out of volatile memory 604 to perform at least a portion of method 500 of FIG. 5. Program code may be applied to data entered using an input device of GUI 608 or received from I/O device 620.

Method 500 is not limited to use with the hardware and software of FIG. 2 or FIG. 6 and may find applicability in any computing or processing environment and with any type of machine or set of machines that is capable of running a computer program. Method 500 of FIG. 5 may be implemented in hardware, software, or a combination of the two.

The methods described herein are not limited to the specific embodiments described. For example, method 500 is not limited to the specific processing order shown in FIG. 5. Rather, any of the blocks of method 500 may be re-ordered, combined or removed, performed in parallel or in serial, as necessary, to achieve the results set forth herein.

Processor 602 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or a general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed:

1. A method for generating a linear frequency modulated (LFM) chirp for a laser detection and ranging (LADAR) transceiver, the method comprising:
   generating a ladder signal from a series of pulses by an array of laser sources based on a timing sequence, the array of laser sources including different types of lasers, wherein each pulse is offset in frequency by a respective frequency offset from a previous pulse and a subsequent pulse in the series of pulses; and
   modulating the ladder signal with a modulation signal having a modulation bandwidth corresponding to the frequency offset between each pulse in the series of pulses to generate a linear chirp signal corresponding to the modulated ladder signal,
   wherein the modulation signal is synchronized to the timing sequence of the ladder signal.

2. The method of claim 1, wherein the linear chirp signal has a chirp bandwidth corresponding to the number of laser sources in the array and the modulation bandwidth of the modulation signal.

3. The method of claim 1, further comprising generating the series of pulses in a predetermined order by the array of laser sources.

4. The method of claim 1, wherein each of the pulses are separated from the previous and the subsequent pulse in the series of pulses by the same frequency offset.

5. The method of claim 1, further comprising sequentially transmitting the series of pulses through a transmission channel to generate the ladder signal, wherein the transmission channel is a single fiber channel.

6. The method of claim 1, wherein a number of steps in the ladder signal corresponds to a number of laser sources in the array.

7. The method of claim 1, wherein the modulation signal is a sawtooth waveform having a plurality of frequency ramps.

8. The method of claim 7, wherein a bandwidth of each of the plurality of frequency ramps corresponds to the frequency offset between each pulse in the series of pulses.

9. The method of claim 7, wherein a start point of each frequency ramp in the sawtooth waveform corresponds to an initiation of a transmission of a pulse from at least one laser source in the array of laser sources.

10. The method of claim 1, further comprising:
    transmitting the linear chirp signal at a target; and
    receiving a return signal from the target.

11. The method of claim 10, further comprising generating a local oscillator (LO) signal corresponding to the linear chirp signal, wherein the LO signal includes a time delay corresponding to a distance between the LADAR transmitter and the target;
    wherein each portion of the LO signal corresponds to a pulse generated by at least one of the laser sources in the array of laser sources.

12. The method of claim 11, further comprising:
    mixing the LO signal with the return signal; and
    generating a de-chirped signal having a phase ramp corresponding to the linear chirp signal.

13. A laser detection and ranging (LADAR) transceiver comprising:
    an array of laser sources coupled to provide a series of pulses to a transmission channel and generate a ladder signal, wherein each pulse is separated in frequency by a frequency offset from a previous pulse and a subsequent pulse in the series of pulses and the array of laser sources including different types of lasers;
    a modulation driver coupled to provide a modulation signal to the transmission channel and generate a modulated ladder signal, wherein the modulation signal has a modulation bandwidth corresponding to the frequency offset between each pulse in the series of pulses, wherein the modulation signal is synchronized to a timing sequence of the ladder signal; and
    an optical bench coupled to receive the modulated ladder signal and generate a linear chirp signal, wherein the linear chirp signal has a chirp bandwidth corresponding to the number of laser sources in the array and the modulation bandwidth of the modulation signal.

14. The LADAR transceiver of claim 13, further comprising an optical switch coupled to the array of laser sources, wherein the optical switch is configured to selectively activate the laser sources in the array to generate the series of pulses in a predetermined order.

15. The LADAR transceiver of claim 13, wherein each of the pulses are separated from the previous pulse and the subsequent pulse in the series of pulses by the same frequency offset.

16. The LADAR transceiver of claim 13, wherein the transmission channel is a single fiber channel.

17. The LADAR transceiver of claim 13, wherein the modulation signal is a sawtooth waveform having a plurality of frequency ramps, and wherein a bandwidth of each of the plurality of frequency ramps corresponds to the frequency offset between each pulse in the series of pulses.

18. The LADAR transceiver of claim 13, further comprising:
- a detector configured to receive a return signal from the target; and
- a local oscillator (LO) signal path coupled to provide a LO signal to the detector, wherein the LO signal corresponds to the linear chirp signal, and wherein the LO signal includes a time delay corresponding to a distance between the LADAR transceiver and the target.

19. The LADAR transceiver of claim 18, wherein each portion of the LO signal corresponds to a pulse generated by at least one of the laser sources in the array of laser sources.

20. The LADAR transceiver of claim 18, wherein the detector is configured to mix the LO signal with the return signal to generate a de-chirped signal having a phase ramp corresponding to the linear chirp signal.

21. The method of claim 1, wherein the different types of lasers include gas-based lasers and coherent diode lasers.

\* \* \* \* \*